(12) United States Patent
Lavoie

(10) Patent No.: US 8,224,529 B2
(45) Date of Patent: Jul. 17, 2012

(54) SELF POWERED STEERING WHEEL ANGLE SENSOR

(75) Inventor: Erick Michael Lavoie, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 1060 days.

(21) Appl. No.: 12/142,943

(22) Filed: Jun. 20, 2008

(65) Prior Publication Data

US 2009/0319125 A1 Dec. 24, 2009

(51) Int. Cl.
*A01B 69/00* (2006.01)

(52) U.S. Cl. ............ 701/42; 701/41; 180/404; 180/412; 180/414; 180/422; 33/288; 33/203.14

(58) Field of Classification Search .............. 701/41–43; 180/404, 412, 414, 422, 445; 33/288, 203.14
See application file for complete search history.

(56) References Cited

U.S. PATENT DOCUMENTS

| 6,314,355 | B1 | 11/2001 | Mizuta et al. |
| 6,380,536 | B1 | 4/2002 | Inoue et al. |
| 6,466,848 | B2 | 10/2002 | Ozaki |
| 6,498,971 | B2 | 12/2002 | Leaphart |
| 6,775,604 | B2 * | 8/2004 | Dilger ............................. 701/41 |
| 2005/0235744 | A1 * | 10/2005 | Ogawa ............................ 73/146 |
| 2006/0293818 | A1 | 12/2006 | Lu et al. |

* cited by examiner

*Primary Examiner* — Thomas Black
*Assistant Examiner* — Luke Huynh
(74) *Attorney, Agent, or Firm* — Angela M. Brunetti; Fredrick Owens

(57) ABSTRACT

A steering wheel angle detection system having a steering wheel angle sensor, a generator and a controller memory such that when a vehicle ignition is powered off, movement of a steering wheel generates electricity and allows a steering wheel angle sensor to detect the change in steering wheel angle. The change, or an indicator, is stored in non-volatile RAM until a time in which the ignition is powered-on. The generator may be a generator dedicated to the steering wheel angle sensor or it may be an electric motor that is part of an electrically assisted power steering system.

20 Claims, 2 Drawing Sheets

SELF POWERED STEERING WHEEL ANGLE SENSOR

TECHNICAL FIELD

The inventive subject matter relates to a steering wheel angle sensor and more particularly, to a self-powered steering wheel angle sensor for which power is supplied in a powered-off state of an ignition switch of a vehicle.

BACKGROUND

A steering angle sensor detects a steering angle of a steering wheel of a vehicle and provides a signal necessary for a vehicle control system to calculate an absolute steering wheel angle from the detected signal. When the vehicle is not in use, the ignition switch is powered off, there is typically no power provided to the steering angle sensor, as it is typically assumed that the steering wheel will remain stationary. However, in rare instances, the steering wheel is turned when the vehicle is powered off, and many vehicle control systems need to know the absolute steering wheel angle upon power-on of the ignition switch. Therefore, a discrepancy between the steering wheel angle sensed at power-off will be present in comparison to the steering wheel angle sensed at power-on.

In order to combat this problem, some solutions provide power to the steering angle sensor, regardless of the state of the ignition switch, from the vehicle's battery. However, since the sensor is always powered-on, the amount of battery power consumed when the ignition is off. Another solution is to store a learned angle and power-off and retrieve the angle as a tentative angle at key-on until the vehicle moves resulting in confirmation or rejection of the tentative angle as the absolute steering angle.

Another alternative is that the steering wheel angle sensor periodically detects the steering angle of the steering wheel when the vehicle's ignition is off. Thereby, conserving power. However, intermittent power introduces the likelihood that a signal will be missed should a steering wheel angle change during a period of no power and may not be a reliable solution.

SUMMARY

The inventive subject matter provides a self-powered steering angle sensor that detects a change in a steering wheel angle during times when an ignition switch is powered off. In order to achieve the object, the inventive subject matter provides a self-powered steering angle sensor comprising a steering angle sensor, an electric generator coupled to the steering wheel angle sensor and actuated upon movement of a steering wheel, and memory for storing changes in the steering wheel angle sensor.

Also provided, is a self-powered steering wheel angle sensor comprising, a steering wheel angle sensor, an electric generator actuated upon movement of a steering wheel, and a controller memory, powered by the electric generator, for storing changes in the steering wheel angle sensor.

When the ignition is powered off, movement of a steering wheel generates electricity and allows a steering wheel angle sensor to detect the change in steering wheel angle. The change, or an indicator, is stored in non-volatile RAM until a time in which the ignition is powered-on. The generator may be dedicated to the steering wheel angle sensor or may be a motor that is part of an electronic powered steering system.

DESCRIPTION OF INVENTION

Figure 1:
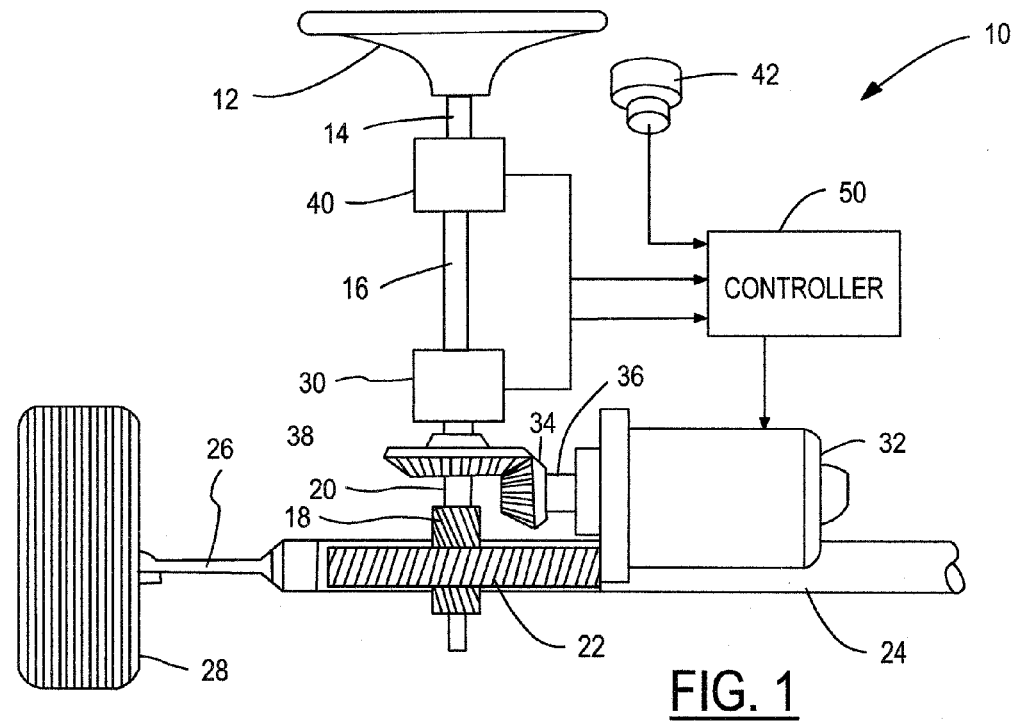
FIG. 1 is a view of an electrically assisted power steering system having a steering angle sensor of the inventive subject matter.

Referring to FIG. 1, an electrically assisted power steering system 10 includes a steering wheel 12 attached to a first end 14 of a steering shaft 16. A steering pinion gear 18, attached to a second end 20 of the steering shaft 16 opposite the first end 14, engages a steering rack gear 22 of a steering rack 24. Each end of the steering rack 24 includes a tie rod 26 attached to a steerable wheel and tire assembly 28 in a conventional manner. It should be noted that while a vehicle having electrically assisted power steering (EPAS) is shown, the inventive subject matter could also be practiced using a generator and as such, may be readily implemented by one of ordinary skill in the art without departing from the scope of the inventive subject matter. The convenience of the EPAS eliminates the need for a separate generator.

A steering torque sensor 30 is incorporated in the steering shaft 16 for detecting a steering torque applied by an operator to the steering shaft 16 by way of the steering wheel 12. An electric motor 32 includes an output gear 34 mounted on an output shaft 36 for drivingly engaging an assist input gear 38 mounted on the steering shaft 16. Alternatively shown in FIG. 2, the electric motor 32' may have its output shaft 36' and an output gear 34' arranged to directly engage the steering rack 24'.

Figure 2:
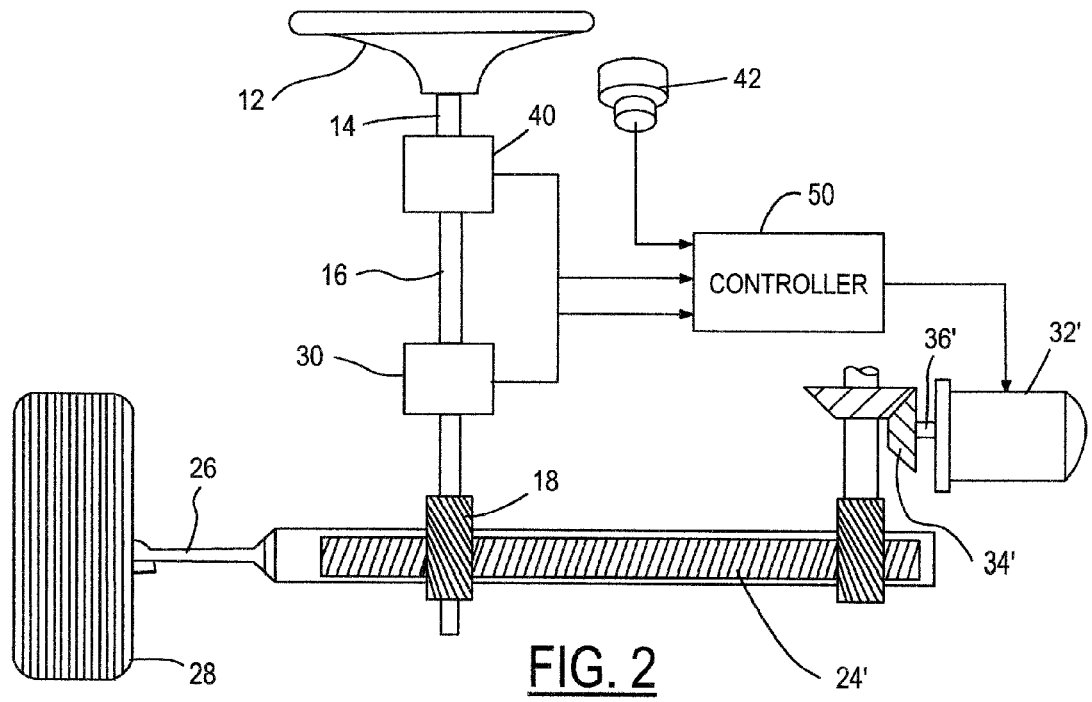
FIG. 2 is a view of another embodiment of an electrically assisted power steering system having a steering angle sensor of the inventive subject matter.

In either FIG. 1 or 2, the electric motor may be a DC brush or brushless motor. It may utilize a three-phase alternating current induction motor. It should be noted that a variable reluctance motor may be substituted for the inductance motor without impacting the performance of the inventive subject matter. Induction and variable reluctance motors are typically used in electrically assisted power steering systems because of their low friction and high torque-to-inertia ratio compared to larger electric motors.

The system includes a steering wheel angle sensor 40 connected to the steering shaft 16 and typically a vehicle speed sensor 42. The steering wheel angle sensor 40 provides a steering angle signal indicative of the relative rotational position of the steering shaft 16. The various signals generated by the system are fed to an electric motor control module 50, which then determines a motor drive signal to actuate the electric motor 32, thereby providing the desired assist torque.

Figure 3:
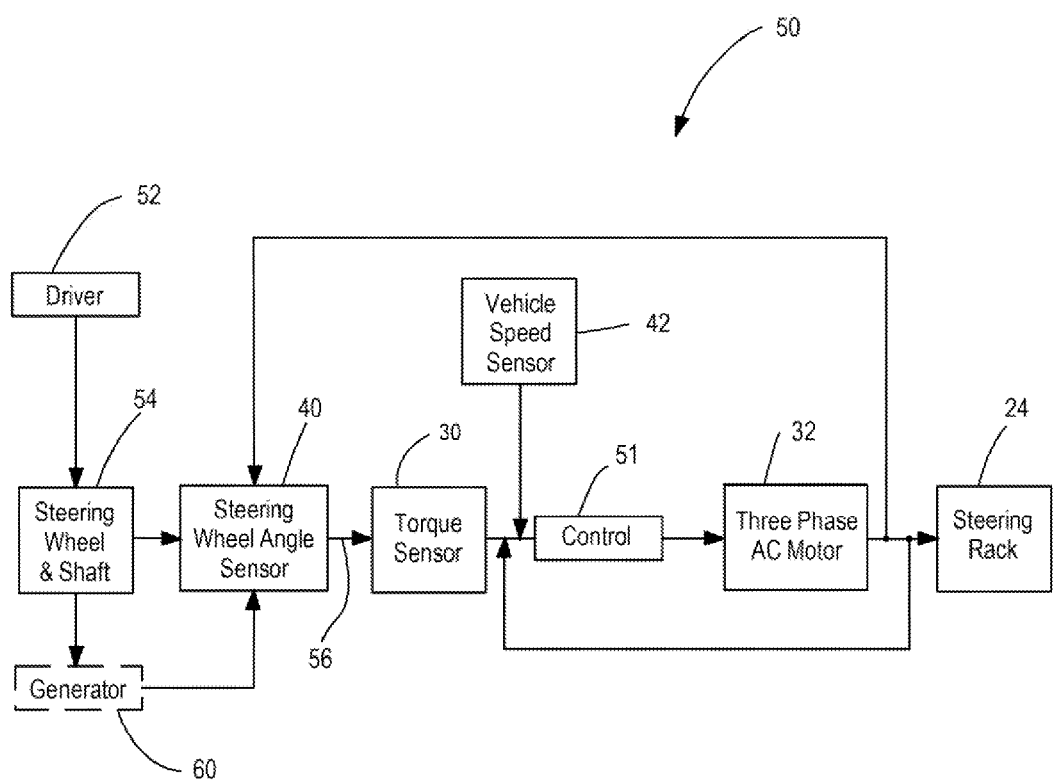
FIG. 3 is a block diagram of an embodiment of the steering angle sensor of the inventive subject matter.

Referring now to FIG. 3, a block diagram is shown representing the control logic contained within the electric motor control module 50 for controlling the self-powered steering angle sensor of the inventive subject matter. Block 52 represents the relationship between a vehicle operator and the steering wheel and steering shaft mounted within the steering column 54. As the operator maneuvers the vehicle, the steering wheel angle sensor 40 generates a steering wheel angle signal 56 to be communicated for control 51. Other sensors, i.e., torque sensor 30 and vehicle speed sensor 42, are also present and active when the vehicle is powered on.

When the vehicle is powered off, any movement of the steering wheel and shaft 54 will drive the three-phase motor 32, or other generator (not shown in FIG. 3) to generate a small amount of power. The power generated by the motor 32 or generator, may be used to store new SWA values in non-volatile RAM, power the SWA sensor and a controller having non-volatile RAM dedicated to updating the SWA during times when the vehicle is powered off, or power the existing controller having non-volatile RAM to store an indication that the steering wheel has moved so that the new SWA may be re-stored at the point in time when the vehicle is powered-on.

FIG. 3 also shown as alternate embodiment of the inventive subject matter in which a separate generator 60 may be used. The generator 60 may be attached at the steering wheel, any one of the road wheels, or any point on the vehicle where there is movement of the steering system 54.

In either embodiment, although the movement may be slight, enough power may be generated, in the generator 60 or in the motor 32, to allow the sensor 40 and controller 51 to sense and store the new SWA. In the alternative, enough power is provided such that an indication that a new SWA is to be detected is stored in the controller 51, so that, at power-on, the new SWA is learned and/or detected.

What is claimed is:

1. A steering wheel angle detecting system for detecting changes in steering wheel position during times when an ignition switch is powered off, the system comprising:
   a steering wheel angle sensor;
   an electric generator coupled to and providing power to the steering wheel angle sensor upon occurrence of steering wheel movement during times when the ignition switch is powered off;
   a controller; and
   memory for storing changes in the steering wheel angle sensor.

2. The system as claimed in claim 1 whereby the electric generator further comprises an electric motor.

3. The system as claimed in claim 2 whereby the electric motor is in an electric power steering system.

4. The system as claimed in claim 1 whereby the memory further comprises non-volatile RAM powered by the electric generator.

5. The system as claimed in claim 4 whereby the controller is dedicated to the steering wheel angle sensor.

6. The system as claimed in claim 5 whereby the RAM stores a steering wheel angle detected by the steering wheel angle sensor.

7. The system as claimed in claim 5 whereby the RAM stores an indicator that a new steering wheel angle is to be detected when the ignition switch is powered-on.

8. The system as claimed in claim 4 whereby the controller is part of an electrically assisted power steering system.

9. The system as claimed in claim 8 whereby the RAM stores a steering wheel angle detected by the steering wheel angle sensor.

10. The system as claimed in claim 8 whereby the RAM stores an indicator that a new steering wheel angle is to be detected when the ignition switch is powered on.

11. A self-powered steering wheel angle sensor comprising:
    a steering wheel angle sensor;
    an electric generator actuated upon movement of a steering wheel; and
    a controller memory, powered by the electric generator, for storing changes in the steering wheel angle sensor when the vehicle ignition is off.

12. The sensor as claimed in claim 11 whereby the steering wheel motion produces electricity in the electric generator.

13. The sensor as claimed in claim 12 whereby the electric generator is an electric motor.

14. The sensor as claimed in claim 13 whereby the electric motor is part of an electric power steering system.

15. The sensor as claimed in claim 11 whereby the memory is non-volatile RAM.

16. The sensor as claimed in claim 15 whereby a new steering when angle is sensed and stored in RAM when the self-powered steering wheel angle sensor is powered by movement of the steering wheel.

17. The sensor as claimed in claim 15 whereby a signal is generated by the steering wheel angle sensor and stored in RAM thereby providing an indication that a new steering wheel angle is to be detected.

18. A steering wheel angle detection system for detecting a change in a steering wheel angle on a vehicle while an ignition switch is powered off, the system comprising:
    a steering wheel angle sensor;
    an electric power steering system having an electric motor that generates electricity from steering wheel motion thereby providing power the steering wheel angle sensor; and
    non-volatile RAM also powered by the electric motor for storing changes in a steering wheel angle.

19. The system as claimed in claim 18 whereby a new steering when angle is sensed and stored in RAM when the self-powered steering wheel angle sensor is powered by movement of the steering wheel.

20. The system as claimed in claim 18 whereby a signal is generated by the steering wheel angle sensor and stored in RAM thereby providing an indication that a new steering wheel angle is to be detected.

* * * * *